United States Patent [19]

Blanpied et al.

[11] Patent Number: 5,342,859
[45] Date of Patent: Aug. 30, 1994

[54] METHOD OF PRODUCING RIGID FOAMS AND PRODUCTS PRODUCED THEREFROM

[75] Inventors: Robert H. Blanpied; Richard L. Donald, both of Meridian, Miss.

[73] Assignee: Atlas Roofing Corporation, Meridian, Miss.

[21] Appl. No.: 121,428

[22] Filed: Sep. 16, 1993

Related U.S. Application Data

[63] Continuation-in-part of Ser. No. 720,735, Jun. 25, 1991, Pat. No. 5,252,625, and a continuation-in-part of Ser. No. 851,889, Mar. 16, 1992, Pat. No. 5,254,600, and a continuation-in-part of Ser. No. 18,304, Feb. 16, 1993, Pat. No. 5,294,677, and a continuation-in-part of Ser. No. 40,032, Mar. 30, 1993, abandoned.

[51] Int. Cl.$^5$ ............... C08G 18/18; C08G 18/22; C08J 9/08
[52] U.S. Cl. ............... 521/125; 521/155; 521/170; 521/174; 521/902; 521/159
[58] Field of Search ............... 521/155, 170, 125, 902, 521/174, 159

[56] References Cited

U.S. PATENT DOCUMENTS

| | | | |
|---|---|---|---|
| 3,940,517 | 2/1976 | DeLeon | 521/902 |
| 3,993,609 | 11/1976 | Kamens et al. | 521/138 |
| 4,485,196 | 11/1984 | Speranza et al. | 521/172 |
| 4,572,865 | 2/1986 | Gluck et al. | 428/309.9 |
| 4,636,529 | 1/1987 | Crooker | 521/131 |
| 4,710,521 | 12/1987 | Soukup et al. | 521/118 |
| 4,710,521 | 12/1987 | Soukup et al. | 521/118 |
| 4,714,717 | 12/1987 | Londrigan et al. | 521/131 |
| 4,740,531 | 4/1988 | Rasshofer | 521/167 |
| 4,898,893 | 2/1990 | Ashida | 521/131 |
| 4,927,863 | 5/1990 | Bartlett et al. | 521/131 |
| 4,960,804 | 10/1990 | Doerge | 521/130 |
| 4,981,879 | 1/1991 | Snider | 521/131 |
| 4,981,880 | 1/1991 | Lehmann et al. | |
| 5,032,623 | 7/1991 | Keske et al. | 521/131 |
| 5,039,713 | 8/1991 | Petrella | |
| 5,084,485 | 1/1992 | Heilig et al. | 521/902 |
| 5,091,436 | 2/1992 | Frisch et al. | 521/137 |

OTHER PUBLICATIONS

N. Malwitz, P. A. Manis, S. W. Wong and K. C. Frisch, "Amine Catalysis of Polyurethane Foams" Annual Polyurethane Conference–Oct. 15–17–1986–pp. 338–353.

*Primary Examiner*—John Kight, III
*Assistant Examiner*—John M. Cooney, Jr.
*Attorney, Agent, or Firm*—Nixon & Vanderhye

[57] ABSTRACT

In a method of producing a polyurethane modified polyisocyanurate foam, at least one alkali metal organosalt catalyst is utilized in an aqueous solution free of aliphatic glycols. The catalyst preferably contains more chemical equivalents of at least one carboxylic acid than chemical equivalents of at least one alkali metal hydroxide dissolved in water. The use of extra or undissolved carboxylic acid, preferably 2-ethyl-hexoic acid, advantageously creates flame resistant amides, as well as creating carbon dioxide as a blowing agent. The use of extra or undissolved carboxylic acid can also reduce the water content of catalysts of the present invention which might have a water content in excess of the desired.

19 Claims, No Drawings

METHOD OF PRODUCING RIGID FOAMS AND PRODUCTS PRODUCED THEREFROM

CROSS REFERENCE TO RELATED APPLICATIONS

This application is a continuation-in-part of U.S. patent application Ser. No. 07/720,735 filed Jun. 25, 1991, now U.S. Pat. No. 5,252,625; and U.S. patent application Ser. No. 07/851,889 filed Mar. 16, 1992, now U.S. Pat. No. 5,254,600; U.S. patent application Ser. No. 08/018,304, filed Feb. 16, 1993, now U.S. Pat. No. 5,294,677, and U.S. patent application Ser. No. 08/040,032, filed Mar. 30, 1993, which is now abandoned; all of which are incorporated herein by reference.

BACKGROUND

1. Field of Invention

This invention pertains to methods of producing foams utilizing a multifunctional isocyanate and a multifunctional polyol, and the foams made thereby. The examples pertain particularly to polyurethane, and polyurethane modified polyisocyanurate foams used for thermal insulation.

2. Related Art and Other Considerations

Cellular organic plastic foams made with urethane linkages, or made with a combination of both isocyanurate linkages and urethane linkages, are well known in the art. These foams have been made from the catalyzed reaction between polymeric polymethylene polyphenylisocyanate (Abbreviated "PMDI") and polyols of various physical and chemical properties. As used herein, the term "PMDI" defines any polymeric polymethylene polyphenylisocyanate which has an average functionality greater than 2.0. The PMDI has been used either alone, or in a blend with an expansion agent and (optionally) with a capped silicone, or other type of surfactant. Such a blend utilizing PMDI has traditionally been called the "A-Blend".

In order to form good cell size, good cell distribution, and cell-wall construction, it has sometimes been preferred to add other "plastic foam cell modifiers" to the foam formulations. It has been preferred to add these other agents to the polyol mixture, often called the "B-Blend". These foam cell modifiers include, but are not limited to: predominantly silicone surfactants, propylene carbonate, dispersing agents, organic surfactants, nucleating agents, fire retardants, expansion agent(s), and catalyst(s).

Organo-metal catalysts have been utilized in polyurethane reactions since implementation of the early stages of Otto Bayer's invention. It has been necessary to produce commercial products in the substantially anhydrous state, as most users could not tolerate water in their system. As defined for use herein, "substantially anyhdrous" means a mixture comprising less than five percent (5%) water by weight. The common organo-metal catalysts have utilized many different metal cations including, but not limited to: tin, antimony, lead, titanium, potassium, and sodium. The organo-portions of the molecules have been simple hydrocarbon groups such as: methyl-, ethyl-, propyl-, butyl-, and higher carbon chains such as from $C_8$ up to $C_{20}$. An example of an early and widely used urethane-chain reaction catalyst is dibutyl-tin-dilaurate. Other early catalysts utilized were the carboxylic acid salts of organo-metallic substances. For example, U.S. Pat. No. 4,246,356 teaches the use of stannous octoate in a flexible foam blown with $CO_2$ from water and a CFC compound. This flexible urethane foam had no isocyanurate linkages due to the use of a two-functional isocyanate.

As polyurethane foams began to become modified with the three-ring trimer linkage made from three multi-functional isocyanates, other catalysts were investigated. For example, U.S. Pat. No. 3,940,517 to DeLeon incorporates prepared alkali metal carboxylate catalysts dissolved in glycols. DeLeon specifically mentions removing the water of reaction with a molecular sieve designated Linde 3A from Union Carbide Corporation. The resulting foam producing system is a substantially anhydrous chemical blend for making polyisocyanurate foam.

Another route utilized in prepared catalyst packages has been the use of quaternary ammonium salts in substantially anhydrous solvent systems. For example, U.S. Pat. No. 4,582,861 to Galla et al, teaches the use of both substantially anhydrous dibutyltin dilaurate catalysts and substantially anhydrous quaternary ammonium salt catalysts in foam systems which incorporated water to effect $CO_2$ as a partial blowing agent. This disclosure incorporates U.S. Pat. No. 4,040,992, to Bechara et al, which discloses a condensation reaction, from which essentially all water is removed. A quaternary amine catalyst is not required in the scope of the present invention; however, one could be optionally added for enhancing the curing process.

Later, as the art of balancing expansion rates with chemical completion rates advanced, U.S. Pat. No. 4,710,521 to Soukup et al disclosed the advantages of premixing alkali metal organo-salt catalysts with certain select tertiary amine catalysts, in favorable ratios, all in a substantially anhydrous glycol solution. The resulting polyurethane or polyisocyanurate foams were all formed from substantially anhydrous chemical blends.

As a general rule, the prior art in closed-cell rigid foam insulation has been concerned with properly controlled reaction rates, whereby the expansion reaction would proceed quickly and smoothly ahead of the chemical polymerization reaction. These foam systems were all substantially anhydrous systems.

In fact, nearly all of the prior art references disclosing both urethane and trimerization reactions together have been substantially anhydrous systems. One exception has been found in U.S. Pat. No. 4,981,880 to Lehmann, which uses trimerization catalysts in the production of open-celled flexible foam. However, Lehmann does not use PMDI, nor does Lehmann use over 1.0 pphp (Parts Per Hundred Parts of Polyol) by weight of trimerization catalyst. The object of the low level of trimerization catalyst in Lehmann is to create some isocyanate dimerization linkages by utilizing the two functional Toluene Di-Isocyanate ("TDI"). This process may add strength to a flexible foam, but it does not create a rigid, solid, closed-cell foam.

It is considered an essential part of the present invention that the PMDI have an average functionality over 2.0. A rigid foam insulation must utilize the cross-linking ability of multifunctional PMDI with polyols. Such a reaction would not be used to produce open-celled flexible foam.

The growing popularity of the urethane modified polyisocyanurate foam insulation has created a demand for many forms of alkali metal organo-salt compounds, all of which have been substantially anhydrous systems prior to the instant invention. The most preferred prior art alkali metal organo-salt catalysts have been either potassium octoate, potassium acetate, sodium succinate, or other potassium or sodium cations with organic carboxylic acid anions, all of which have been in solution with ethylene-, propylene-, or diethylene- glycols, or in a combination of organic glycol solvents. While some commercial blends have contained small amounts of water (which the producers were unwilling or unable to remove), all such blends contain less than 5% water by weight.

Another class of prior art trimerization catalysts have been the quaternary ammonium salts in an anhydrous system utilizing glycol solvents. All of these prior art preferred catalyst systems have been substantially anhydrous systems. The manufacturers of these products have gone to great lengths to either vacuum distill, or molecular sieve filter, small amounts of water from these products so that the water does not exceed 5% by weight.

Since the beginning of CFC blowing agent phase-outs, the use of $CO_2$ as part of the expansion agent system has been attempted with varying degrees of success. Novel methods of utilizing $CO_2$ as a successful replacement for a minor portion of the required foam expansion in a rigid, closed-cell foam insulation, has been taught in U.S. patent application Ser. No 07/720,735 filed Jun. 25, 1991, now U.S. Pat. No. 5,252,625; and also U.S. patent application Ser. No. 07/851,889 filed Mar. 16, 1992, now U.S. Pat. No. 5,254,600; both of which are incorporated herein by reference.

The prior art also recognizes the need to maintain adequate cell-wall viscosity while the cells are rapidly enlarging. For example, U.S. patent application Ser. No. 07/495,616 filed Mar. 19, 1990, and U.S. patent application Ser. No. 07/720,735, filed Jun. 25, 1991, now U.S. Pat. No. 5,252,625 (all incorporated herein by reference) teaches the advantageous use of polyols with higher viscosities than prior art polyols. It shows that even using less HCFC-141b blowing agent than was previously used as CFC-11, the A-Blends and B-Blends could have unworkably low viscosities. If the liquid blends have viscosities too low, the cell-walls will rupture open prior to the chemical reaction firming them up. The use of polyols with higher viscosities is a novel approach to overcoming that particular problem.

The prior art alkali metal organo-salt compounds have been successful in the job of trimerizing three molecules of PMDI. However, the glycol solvents which have been used to "carry" the prior art alkali metal organo-salt compounds into the B-Blend are substantial users of isocyanate functional groups, to the detriment of the resultant foam. It is known to those skilled in the art, that a urethane foam made from ethylene glycol and PMDI will burn more easily than any other type of urethane foam. It is also too friable to be used to meet commercial foam insulation board standards.

In the commercially prepared potassium acetate materials, the major glycol carrier is ethylene glycol. When diethylene glycol (DEG) is used as the glycol carrier, a larger amount is required (as opposed to ethylene glycol) as a solvent in commercially prepared potassium octoate catalysts. Both ethylene glycol and DEG unfavorably react with the isocyanate functional groups. Hence, in order to maintain the same ratio of chemical equivalents (Index), the weight percent of PMDI must be increased in a foam utilizing a commercial catalyst containing glycols, as opposed to utilizing the catalyst of this invention.

Thus it is seen that prior art formulations utilizing commercial anhydrous alkali metal organo-salt compounds are more expensive due to higher levels of PMDI, and often times create a foam inferior in physical properties to the novel formulations presented in the instant invention.

It is therefore an object of the present invention to provide an improved method for the production of a rigid thermosetting plastic foam insulation.

An advantage of the present invention is that the formulations do not contain any unwanted hydroxyl functional groups carried by the alkali metal organo-salt catalyst compounds.

Another advantage of the present invention is the elimination of unwanted friability created by ethylene glycol urethane linkage.

Yet another advantage of the present invention is that in the event glycols are desired to modify the foam, complete control of which glycols to use is provided.

An advantage of the present invention is the creation of a more desirable relationship between the rate-of-expansion curve and the rate-of-reaction curve.

Another advantage of the present invention is the further reduction of cost provided by reducing the required percent by weight of PMDI to achieve any given chemical equivalents ratio.

Yet another advantage of the present invention is the creation of flame resistant amide groups, plus additional carbon dioxide amounts not obtainable in the prior art.

A further advantage of the present invention is the ability to produce foams, when desired, with low carbon dioxide content.

A further advantage of the present invention is the provision of a strong, economical, closed cell foam insulation which is characterized by a high degree of fire resistance, a high initial resistance to thermal conductivity, and a long-term thermal resistance. by weight.

DETAILED DESCRIPTION OF THE INVENTION

The method of the present invention is used to prepare foams which have either urethane or isocyanurate linkages, or both. The present invention provides a method for catalyzing the reaction between isocyanate and hydroxyl functional groups, and between two or more isocyanate groups.

The obsolete class of blowing agents referred to in the past as "CFCs" has been replaced by the environmentally more acceptable classes of fluoronated hydrocarbons.

As used herein, the term "expansion agents" includes blowing agents and frothing agents. Moreover, as used herein, a blowing agent is a substance which is either produced or becomes a gas subsequent to the first of several chemical reactions. Many blowing agents have boiling points in the range from about 10° C. to about 50° C. On the other hand, $CO_2$ is considered a blowing agent since, although it has a boiling point outside this range, it is produced by an isocyanate reaction. A frothing agent is a substance which is a liquid under sufficient pressure, then when released from pressurized containment, accordingly produces gas-filled cells in foam prior to the initial chemical reaction. Many frothing agents have boiling points falling in the range of about −52° C. to 10° C.

The foams of the present invention are made from B-Blends having at least a minor amount of water incorporated therein to produce $CO_2$ expansion agent. In addition, the foams may optionally utilize other expansion agents, including those disclosed in U.S. Pat. No. 5,166,182 (which is hereby incorporated herein by reference), those partially hydrogenated fluorocarbons known as "HFCs", those partially hydrogenated chlorofluorocarbons

SUMMARY

In a method of producing a polyurethane modified polyisocyanurate foam, at least one alkali metal organo-salt catalyst is utilized in an aqueous solution free of aliphatic glycols. The catalyst preferably contains more chemical equivalents of at least one carboxylic acid than chemical equivalents of at least one alkali metal hydroxide dissolved in water.

At least some portion, up to 100%, of the desired water level utilized for creation of $CO_2$ is provided by the water in the salt solution of this invention. The absence of low molecular weight glycols, such as ethylene glycol, propylene glycol, and diethylene glycol, reduces the amount of polymeric methylene polyisocyanate needed to create a polyurethane foam or a modified polyisocyanurate foam of the same chemical equivalent ratio, or "Index", as a foam utilizing a catalyst using glycols as a carrier. The rate of rise profile as compared to the rate of chemical reactions profile is likewise more favorable utilizing the methods of the present invention.

The use of extra or undissolved carboxylic acid, preferably 2-ethyl-hexoic acid, advantageously creates flame resistant amides, as well as creating carbon dioxide as a blowing agent. Moreover, it is believed that the excess of 2-ethyl-hexoic acid mixed with water creates a synergistic reaction which provides more carbon dioxide molecules than the simple summation of carbon dioxide molecules produced by each additive alone.

The use of extra or undissolved carboxylic acid also reduces the water content of catalysts of the present invention which might have a water content in excess of the desired. In this regard, the first reaction occurs between equal chemical equivalents of organic acid(s) and alkali metal hydroxide(s), which is followed by an application of vacuum to distill excess water to a level greater than 5.0% known as "HCFCs", those fully fluoronated fluorocarbons known as "FCs", and those partially hydrogenated fluorocarbon ethers abbreviated as "HFC-Ethers".

Thus the present invention requires only that $CO_2$ be created for at least some, if not all, of the cellular formation causing the thermosetting plastic to foam.

Likewise the polyol utilized may be any prior art polyol from the broad class of polyether polyols which are distinguished by their higher average functionalities; or, from the broad class of polyester polyols distinguished by their average functionalities being less than three, usually at 2.0 or just above.

The polymeric polymethylene polyphenylisocyanate utilized in the present invention may be any having an average isocyanate functionality greater than two.

This invention is distinguished by the deliberate elimination of glycol-type carriers, or solvents, from the alkali metal organo-salt catalyst. However, it may be desirable to add selected aliphatic glycols to the B-Blend to modify the characteristics of the foam. The advantage of the present invention is that complete control over which glycols to add is provided. The designer is not forced to add those glycols which come in commercially prepared alkali metal organo-salt catalysts. Likewise, the foam designer can optionally add glycols to the A-Blend in order to make prepolymers of choice.

The catalyst system of the present invention requires only that at least some of the reaction is catalyzed by an alkali metal organo-salt catalyst. It may well be the only catalyst employed, as some reactions do not require the use of tertiary amine catalysts, or quaternary amine salt catalysts. The resulting polymer matrix must have at least a minor amount of cellularity caused by the $CO_2$ creation and expansion. In other words, no upper or lower limits are placed on the density of the foam, just so long as the plastic contains some cellularity.

While the following examples utilize the present invention to create useful polyisocyanurate high Index foam board insulation, it is contemplated that it will prove useful for lower Index polyurethane rigid foam insulation, for higher density urethane foams to be used for automobile and other functional plastic parts, and for simulated wood and other decorative plastic items or parts, and the like. The instant invention can be employed anywhere a polyurethane foam, or a polyisocyanurate modified polyurethane cellular foam plastic can be advantageously utilized.

CATALYST PREPARATION EXAMPLES - GROUP I

Catalyst Example #1

Commercially prepared Potassium Acetate salt crystals are diluted in demineralized water at a concentration of 63% Potassium Acetate by weight.

Catalyst Example #2

A concentrated solution of potassium hydroxide is first prepared by slowly diluting 50% of the final weight as KOH pellets in 50% of the final weight as demineralized water, while cooling the reaction and providing for overhead reflux to capture the vaporizing water. Commercial glacial acetic acid is reacted with the concentrated solution of potassium hydroxide in demineralized water to provide the same 63% Potassium Acetate by weight solution as Catalyst Example #1. Cooling, mixing, and reflux is provided during the entire reaction. This example contains 37% water and 25% potassium. It is referred to herein as KAT-25.

Catalyst Example #3

The 50% KOH solution of Catalyst Example #2 is used by weighing out 3.0 mols of KOH on a dry basis (168.33 g.), or 336.66 grams of the 50% solution. To this strong base is added 1 mol of glacial acetic acid and 2 mols of 2-ethyl-hexoic acid. Cooling, mixing, and reflux is also provided. This example contains 32.45% water and 17.12% potassium, by weight.

Catalyst Example #4

The 50% KOH solution of Catalyst Example #2 is used by weighing out 1.05 mols of KOH, or 117.83 grams of the 50% solution. To this strong base is added one-half mol of glacial acetic acid (30.03 g.) and one-half mol of 2-ethyl-hexoic acid (72.11 g). Cooling, mixing, and reflux is provided. This example contains 34.97% water and 18.66% potassium, by weight.

Catalyst Example #5

The 50% KOH solution of Catalyst Example #2 is used by weighing out 1.6 mols of KOH, or 179.55 grams of the 50% solution. To this strong base is added 1.0 mol of glacial acetic acid (60.06 g) and one-half mol of 2-ethylhexoic acid (72.11 g). Cooling, mixing, and reflux is provided. This example contains 37.46% water and 20.07% potassium, by weight.

CATALYST PREPARATION EXAMPLES - GROUP II

For some purposes, the catalysts of Group I can be improved by adding an excess of an organic acid. The term "excess" as used herein defines the conditions where the chemical equivalents of the carboxylic acid(s) used are higher than the chemical equivalents of the alkali metal hydroxide(s) used. Chemical equivalents are defined as the parts by weight added divided by the equivalent weight of that material.

The catalysts of Group I might also be limited in use by having minimum water levels too high for producing a particular foam which calls for low levels of carbon dioxide blowing agent. Some of the catalysts of Group II have less water content. Specifically, in producing some catalysts of Group II, a first reaction occurs between equal chemical equivalents of organic acid(s) and alkali metal hydroxide(s). This first reaction is followed by application of vacuum to distill excess water to a level greater than 5.0% by weight.

Catalyst Example #6

The 50% KOH solution of Catalyst Example #2 is used by weighing out 336.66 grams of the 50% solution, or 3.0 mols of KOH on a dry basis (168.33 g.). To this strong base is first added 2.0 mols of 2-ethyl-hexoic acid (288.44 g.), followed by 1.0 mol of glacial acetic acid (60.06 grams of pure $C_2H_4O_2$). This reaction is carried out at 97° C. to 98° C. under a reflux condenser while mixing. This example contains 32.45% water (depending on the purity of the organic acids) and 17.12% potassium, by weight.

Catalyst Example #7

A commercial batch of catalyst is produced in a reactor with adequate mixing capability, and an overhead system for both distillation and reflux. A commercial KOH solution is assayed at 48.2% solids, an acetic acid assayed at 98.06%, and a 2-ethyl-hexoic acid assayed at 99.9%. First, 711.0 pounds of 2-ethyl-hexoic acid is added. To this organic acid is added 614 pounds of the KOH solution with constant mixing, and external heat applied with reflux. The temperature is controlled to 92° C., +/−2° C. and the external heat is removed. Next, 188.5 pounds of acetic acid is added as rapidly as possible. The exotherm raises the temperature to 97° C. Then the remaining 318.5 pounds of the KOH solution is added slowly while the temperature is monitored. It holds between 96° C. and 98° C. A total of 932.5 pounds of the KOH solution is added. At this point, the total batch weighs 1832.0 pounds, of which 631.48 pounds are water; or 34.47%. The total water is calculated from: 1) 0.71-lb. from 2-ethyl-hexoic acid; 2) 483.04-lb. from the KOH solution; 3) 3.66-lbs. from acetic acid; and 4) 144.07lbs. from the acid-base reaction.

A vacuum is applied to the overhead distillation system, and the external heat is again applied. A total of 419.64 pounds of water are removed, reducing the total batch to 1412.4 pounds, of which 211.85 pounds are water; or 15.0% water. Further calculations determine the percent potassium content to be 22.18%. This product is named KAT-22, due to the percent potassium being about 22%.

Catalyst Example #8

The product of Catalyst Example #7 is cooled and blended with 2-ethyl-hexoic acid at the ratio of 2.0 parts by weight Kat-22 (Catalyst Example #7) to 1.0 parts by weight 2-ethyl-hexoic acid. This reduces the water content to 10.0%, and the potassium content to 14.8%. This product is named KAT-15, due to the percent potassium being about 15%.

Catalyst Examples #9 and #10

The product of Catalyst Example #8 is blended with a surfactant such as nonyl phenol having 9 to 10 mols of ethylene oxide added. A commercial product such as NP-95 from Texaco has an average 9.5 mols of ethylene oxide added to nonyl phenol. Catalyst Example #8 is blended with NP-95 at a ratio of 9-to-1=KAT-15-to-NP-95 (Example #9), and at a ratio of 9.5-to-0.5=KAT-15-to-NP-95 (Example #10) to assist in preventing separation of the dense KAT-15 from the excess of low density 2-ethyl-hexoic acid.

| | PRIOR ART FOAM COMPARED TO THE SAME INDEX FOAM USING CATALYSTS OF GROUP I Foam Examples No. 1 and No. 2 | |
|---|---|---|
| Component: | Example #1 Prior Art Formula: Parts By Weight: | Example #2 New Formula: Parts By Weight: |
| Stepanpol PS-2502A | 100.00 | 100.00 |
| Propylene Carbonate | 7.20 | 7.20 |
| Silicone Surfactant | 2.00 | 2.00 |
| Polycat 5 | 0.30 | 0.30 |
| CFC-11 | 22.00 | 21.70 |
| Dabco K-15 | 5.20 | — |
| Catalyst Example #2 | — | 3.12** |
| Water | 1.44 | 0.20*** |
| Total B-Blend Weight = | 138.14 | 134.52 |
| PMDI By Weight, EW = 135.6 | 203.97 | 187.77 |
| CFC-11 | 10.15 | 8.50 |
| DC-5098 | 0.72 | 0.70 |
| Total A-Blend Weight = | 214.84 | 196.97 |
| Total Foam Weight = | 352.98 | 331.49 |
| Percent PMDI By Weight = | 57.79% | 56.64% |
| Foam Index = | 2.40 | 2.40 |
| Free Rise Density | 1.77 pcf | 1.76 pcf |
| REACTIVITIES AND RATE OF RISE: Seconds | | |
| Cream Time = | 13" | 14" |
| Three Inch Level = | 20" | 19" |
| Gel Time = | 20" | 20" |
| Six Inch Level = | 30" | 27" |
| String Time = | 31" | 32" |
| Tack Free Time = | 42" | 41" |
| Time To Maximum Rise = | 62" | 62" |

**Catalyst Example #2 = 63% Potassium Acetate; 37% Water; i.e., 37% of 3.12 = 1.15.
***Water added at 0.20, plus the above 1.15 = 1.35.

Both formulations have approximately 25% of the blowing provided by $CO_2$.

One skilled in the art will appreciate that the above data points (see the reactivities and rate of rise data points) indicate the catalyst of the present invention causes the rate of expansion of Example #2 to proceed faster than the rate of expansion of Example #1.

| Foam Examples No. 3 and No. 4 | | |
|---|---|---|
| Component: | Example #3 Prior Art Formula: Parts By Weight: | Example #4 New Formula: Parts By Weight: |
| Stepanpol PS-2502A | 100.00 | 100.00 |
| Propylene Carbonate | 7.50 | 7.50 |
| Silicone Surfactant | 1.33 | 1.33 |
| Polycat 5 | 0.25 | 0.25 |
| CFC-11 | 31.84 | 29.71 |
| Dabco K-15 | 6.20 | — |
| Catalyst Example #3** | — | 3.90** |
| Water | 1.94 | 0.54*** |
| Total B-Blend Weight = | 149.06 | 143.23 |
| PMDI By Weight, EW = 135.6 | 226.00 | 205.51 |
| CFC-11. | 11.75 | 10.68 |
| DC-5098 | 0.67 | 0.67 |
| Total A-Blend Weight = | 238.42 | 216.86 |
| Total Foam Weight = | 387.48 | 360.09 |
| Percent PMDI By Weight = | 58.33% | 57.07% |
| Foam Index = | 2.42 | 2.42 |
| Free Rise Density | 1.74 pcf | 1.73 pcf |
| REACTIVITIES AND RATE OF RISE: Seconds | | |
| Cream Time = | 13" | 14" |
| Three Inch Level = | 20" | 20" |
| Gel Time = | 21" | 23" |
| Six Inch Level | 27" | 27" |
| String Time | 33" | 35" |
| Tack Free Time = | 43" | 45" |
| Time To Maximum Rise = | 84" | 83" |

**Catalyst Example #3 = 17.12% Potassium; 32.45% Water; i.e., 32.45% of 3.90 = 1.27.
***Water added at 0.54, plus the above 1.27 = 1.81.

Both formulations have approximately 25% of the blowing provided by $CO_2$.

One skilled in the art will appreciate that the above data points indicate the catalyst of the present invention causes the rate of expansion, as compared to the rate of reaction in Example #4, to have a more favorable ratio than the comparable data of Example #3.

| Foam Examples No. 5 and No. 6 | | |
|---|---|---|
| Component: | Example #5 Prior Art: Parts By Weight: | Example #6 New Invention: Parts By Weight: |
| Stepanpol PS-2352 | 100.00 | 100.00 |
| Silicone Surfactant | 2.50 | 2.50 |
| Polycat 5 | 0.25 | 0.25 |
| HCFC-141b | 22.55 | 21.03 |
| Dabco K-15 | 3.70 | — |
| KAT-25** | — | 2.20** |
| Water | 1.728 | 0.84*** |
| Total B-Blend Weight = | 130.73 | 126.82 |
| PMDI By Weight, EW = 139.14 | 230.80 | 217.52 |
| HCFC-141b | 10.92 | 10.92 |
| DC-5098 | 0.53 | 0.53 |
| Total A-Blend Weight = | 242.25 | 228.97 |
| Total Foam Weight = | 372.98 | 355.79 |
| Percent PMDI By Weight = | 61.88% | 61.14% |
| Foam Index = | 2.58 | 2.58 |
| Free Rise Density | 1.73 pcf | 1.72 pcf |
| REACTIVITIES AND RATE OF RISE: Seconds | | |
| Cream Time = | 13" | 15" |
| Three Inch Level = | 23" | 22" |
| Gel Time = | 28" | 28" |
| Six Inch Level | 34" | 30" |
| String Time | 39" | 37" |
| Tack Free Time = | 49" | 45" |
| Time to Maximum Rise = | 106" | 94" |

**KAT-25 = 63% Potassium Acetate; 37% Water; i.e., 37% of 2.20 = 0.814.
***Water added at 0.84 in addition to the 0.814 = 1.654.

Both formulations have approximately 25% of the blowing provided by $CO_2$.

One skilled in the art will appreciate that the above timed data points indicate that the catalyst of the present invention causes the rate of expansion of Example #6 to proceed faster than the rate of expansion of Example #5. Additionally, the ratio of expansion rate to the reaction rate is more favorable utilizing the catalyst of the present invention.

The following Foam Examples 8–11 show the differences in the reactivities utilizing Catalyst Examples 2–5. Also, they show the improvement utilizing the catalysts of the present invention as compared to prior art, shown as Foam Example #7. The abbreviation, C.E., means Catalyst Example.

| Foam Examples Nos. 7, 8, 9, 10, & 11. All numbers represent "Parts By Weight" | | | | | |
|---|---|---|---|---|---|
| Component: | #7. | #8. | #9. | #10. | #11. |
| Polyol PS-2352 | 100.00 | 100.00 | 100.00 | 100.00 | 100.00 |
| DC-5098 | 2.56 | 2.56 | 2.56 | 2.56 | 2.56 |
| Polycat 5 | 0.25 | 0.25 | 0.25 | 0.25 | 0.25 |
| HCFC-141b | 20.88 | 20.43 | 20.54 | 20.52 | 20.50 |
| Dabco K-15 | 2.90 | — | — | — | — |
| C.E. #2. | — | 1.44 | — | — | — |
| C.E. #3. | — | — | 2.54 | — | — |
| C.E. #4. | — | — | — | 2.33 | — |
| C.E. #5. | — | — | — | — | 2.17 |
| Water In Cat.** | — | (0.533) | (0.824) | (0.815) | (0.813) |
| Water To Add. | 0.83 | 0.279 | 0.191 | 0.190 | 0.189 |
| Tot. Blend Wt. | 127.42 | 124.96 | 126.08 | 125.85 | 125.67 |
| PMDI | 183.12 | 177.95 | 178.08 | 178.05 | 178.03 |
| HCFC-141b | 9.19 | 8.90 | 8.90 | 8.90 | 8.90 |
| DC-5098 | 0.44 | 0.44 | 0.44 | 0.44 | 0.44 |
| Tot. Blend Wt. | 192.75 | 187.29 | 187.42 | 187.39 | 187.37 |
| Foam Index | 2.50 | 2.50 | 2.50 | 2.50 | 2.50 |
| Density, PCF | 1.878 | 1.899 | 1.783 | 1.793 | 1.781 |
| REACTIVITIES AND RATE OF RISE: Seconds | | | | | |
| Cream Time = | 15" | 15" | 15" | 15" | 15" |
| Three Inch = | 21" | 22" | 24" | 23" | 23" |
| Gel Time = | 24" | 26" | 28" | 27" | 28" |
| Six Inch = | 29" | 29" | 30" | 30" | 31" |
| String Time = | 33" | 32" | 35" | 34" | 34" |
| Tack Free = | 44" | 42" | 45" | 44" | 45" |
| Max. Rise = | 96" | 86" | 100" | 100" | 100" |

**This water weight is included in the weight of the Catalyst Example.

All five Foam Examples above have approximately 15% to 25% of the blowing volume provided by $CO_2$ from the MDI reaction with water. The foams of the present invention all have at least 5.0 pphp less PMDI than prior art Foam Example #7. Also, the above timed data points indicate that the catalysts of the present invention cause the rate of expansion to proceed faster than the prior art. Note that there is only 3 seconds separating the 3-inch rise from the Gel Time in Example #7, whereas the others show at least 4 seconds. Of more importance, there is a 5 second gap between the Gel Time and the 6-inch rise in Example #7, but only 3 seconds in the foams of the present invention.

lyst of this invention reduces the use of PMDI at the same 2.5 Index.

| PRIOR ART FOAM COMPARED TO THE SAME INDEX FOAM USING CATALYSTS OF GROUP II | | | |
|---|---|---|---|
| | Foam Examples Nos. 12, 13, & 14 | | |
| Component: | Example #12 Prior Art: Parts by Wt: | Example #13 New Invention: Parts by Wt.: | Example #14 New Invention: Parts by Wt.: |
| Stepanpol PS-2352 | 85.00 | 85.00 | 85.00 |
| Voranol 490 | 15.00 | 15.00 | 15.00 |
| Silicon Surfactant | 2.47 | 2.47 | 2.47 |
| Polycat 5 | 0.25 | 0.25 | 0.25 |
| HCFC-141b | 28.81 | 28.04 | 28.39 |
| Dabco K-15 | 4.00 | — | — |
| Catalyst Ex. #7 | — | 2.70 | — |
| Catalyst Ex. #8 | — | — | 5.50 |
| Water Added | 1.10 | 0.66 | 0.53 |
| Water with Catalyst | — | 0.41 | 0.55 |
| Tot. B-Blend Wt. | 136.63 | 134.12 | 137.14 |
| PMDI by weight EW = 139.14 | 219.21 | 210.78 | 211.18 |
| HCFC-141b | 11.01 | 10.54 | 10.56 |
| DC-5098 | 0.53 | 0.53 | 0.53 |
| Tot. A-Blend Weight | 230.75 | 221.85 | 222.27 |
| Total Foam Weight | 367.38 | 355.97 | 359.41 |
| Percent PMDI (By weight) | 59.67% | 59.21% | 58.76% |
| Free-Rise Cup Density | 1.70 PCF | 1.66 PCF | 1.56 PCF |
| Percent Water in Foam | 0.30% | 0.30% | 0.30% |
| Percent HCFC-141b in Foam | 10.84% | 10.83% | 10.83% |
| RATE OF RISE AND REACTIONS: Seconds | | | |
| Cream Time = | 15" | 15" | 15" |
| Three Inch Level = | 23" | 22" | 22" |
| Gel Time = | 26" | 26" | 26" |
| Six Inch Level = | 30" | 30" | 30" |
| String Time = | 34" | 34" | 36" |
| Tack Free Time = | 44" | 44" | 46" |
| Time to Maximum Rise = | 98" | 98" | 98" |

Foam Examples Nos. 12, 13, and 14 are at 68 degrees Fahrenheit, a 2.5 Index, and have approximately 15% of the blowing volume provided by carbon dioxide made from the water and isocyanate reaction. Note that the density of Example #14 is a full 0.1 PCF lower than Example #13 (6.0%), and 0.14 PCF (8.2%) lower than Example #12 at the same level of water and HCFC-141b. This features the synergistic effect of excess 2-ethyl-hexoic acid as a blowing agent additive. The cata- Foam Examples Nos. 15, 16, & 17

Foam Examples #15, 16, and 17 have the same components as Examples 12, 13, & 14; except that the polyol of Examples 15, 16, & 17 is 100% Stepanpol 2352, in place of the 85% Stepanpol blend with 15% Voranol 490. Because the Voranol 490 blend slows the reaction speed as opposed to 100% polyester polyol, the chemical temperatures of Examples 15, 16 & 17 have been reduced from 68° F. to 63° F. to show a more direct comparison.

| Component: | Example #15 Prior Art: Parts by Wt: | Example #16 New Invention: Parts by Wt.: | Example #17 New Invention: Parts by Wt.: |
|---|---|---|---|
| Stepanpol PS-2352 | 100.00 | 100.00 | 100.00 |
| Silicon Surfactant | 2.47 | 2.47 | 2.47 |
| Polycat 5 | 0.25 | 0.25 | 0.25 |
| HCFC-141b | 28.81 | 28.04 | 28.39 |
| Dabco K-15 | 4.00 | — | — |
| Catalyst Ex. #7 | — | 2.70 | — |
| Catalyst Ex. #8 | — | — | 5.50 |
| Water Added | 1.12 | 0.66 | 0.53 |
| Water with Catalyst | — | 0.41 | 0.55 |
| Tot. B-Blend Wt. | 136.65 | 134.12 | 137.14 |
| PMDI by weight EW = 139.14 | 225.00 | 210.78 | 211.18 |
| HCFC-141b | 11.67 | 10.54 | 10.56 |
| DC-5098 | 0.53 | 0.53 | 0.53 |
| Tot. A-Blend | 237.20 | 221.85 | 222.27 |
| Total Foam Weight | 373.85 | 355.97 | 359.41 |
| Percent PMDI (By weight) | 60.18% | 59.21% | 58.76% |
| Free-Rise Cup Density | 1.75 PCF | 1.70 PCF | 1.62 PCF |
| Percent Water in Foam | 0.30% | 0.30% | 0.30% |
| Percent HCFC-141b | 10.83% | 10.83% | 10.83% |

-continued

| Component: | Example #15 Prior Art: Parts by Wt: | Example #16 New Invention: Parts by Wt.: | Example #17 New Invention: Parts by Wt.: |
|---|---|---|---|
| in Foam | | | |
| RATE OF RISE AND REACTIONS: Seconds | | | |
| Cream Time = | 15" | 15" | 15" |
| Three Inch Level = | 21" | 23" | 23" |
| Gel Time = | 24" | 27" | 28" |
| Six Inch Level = | 29" | 30" | 31" |
| String Time = | 33" | 34" | 34" |
| Tack Free Time = | 44" | 44" | 45" |
| Time to Maximum Rise = | 96" | 100" | 100" |

Foam Examples #15, 16 & 17 are at 63° F., a 2.8 Index, and have approximately 15% of the blowing volume provided by $CO_2$ made from the water and isocyanate reaction. Note that there are only three seconds separating the 3-inch Rise from the Gel Time in Example #15, whereas the new invention shows at least 4 seconds. Of more importance, there is a 5 second gap between the Gel Time and the 6-inch Rise of Prior Art Example #15, but only 3 seconds between the foams of the present invention. Also note the lower density and percent PMDI when utilizing the preferred catalyst of the present invention.

While the invention has been particularly shown and described with reference to the preferred embodiments thereof, it will be understood by those skilled in the art that various alterations in form and detail may be made therein without departing from the spirit and scope of the invention.

What is claimed is:

1. A method of producing a rigid thermosetting foam, the method comprising the steps of:
   (1) preparing a first of two foam forming blends using a multi-isocyanate functional compound chosen from the group consisting of polymeric polymethylene polypheylisocyanate, and a prepolymer made therefrom;
   (2) preparing a second of two foam forming blends by mixing together:
      (a) a polyol;
      (b) a first blowing agent which is not carbon dioxide derived from water;
      (c) an alkali metal organo-salt catalyst of a minimum concentration of about 63% in an aqueous solution free of aliphatic glycols;
      (d) optionally an additional amount of water for producing carbon dioxide as a second blowing agent;
   (3) mixing together the first and second foaming blends to cause a polymerization reaction producing the rigid foam such that the total amount of water utilized is less than 1% by weight of the total foam.

2. The method of claim 1, wherein the total amount of water utilized is less than 0.88% by weight of the multi-isocyanate functional compound.

3. The method of claim 1, wherein the alkali metal organo-salt catalyst is a pre-blended and reacted mixture of an alkali metal hydroxide, carboxylic acid, and water.

4. The method of claim 3, wherein the alkali metal hydroxide is potassium hydroxide, and the carboxylic acid is acetic acid.

5. The method of claim 3, wherein the alkali metal hydroxide is potassium hydroxide, and the carboxylic acid is 2-ethyl-hexoic acid.

6. The method of claim 3, wherein the alkali metal organo-salt catalyst is a pre-blended and reacted mixture of at least one alkali metal hydroxide, at least two carboxylic acids, and water, wherein the alkali metal hydroxide is potassium hydroxide, and the carboxylic acids are a mixture of 2-ethyl-hexoic acid and acetic acid.

7. The method of claim 3, wherein the alkali metal organo-salt catalyst is a pre-blended and reacted mixture of at least one alkali metal hydroxide, at least two carboxylic acids, and water, wherein the alkali metal hydroxide is sodium hydroxide, and the carboxylic acids are a mixture of 2-ethyl-hexoic acid and acetic acid.

8. The method of claim 3, wherein the alkali metal organo-salt catalyst is a pre-blended and reacted mixture of at least two alkali metal hydroxides, at least one carboxylic acid, and water, wherein the alkali metal hydroxides are potassium hydroxide and sodium hydroxide, and the carboxylic acid is acetic acid.

9. The method of claim 3, wherein the alkali metal organo-salt catalyst is a pre-blended and reacted mixture of at least two alkali metal hydroxides, at least one carboxylic acid, and water, wherein the alkali metal hydroxides are potassium hydroxide and sodium hydroxide, and the carboxylic acid is 2-ethyl-hexoic acid.

10. The method of claim 3, wherein the alkali metal organo-salt catalyst is a pre-blended and reacted mixture of at least two alkali metal hydroxides, at least two carboxylic acids, and water, wherein the alkali metal hydroxides are potassium hydroxide and sodium hydroxide, and the carboxylic acids are a mixture of acetic acid and 2-ethyl-hexoic acid.

11. The method of claim 3, wherein the alkali metal hydroxide is sodium hydroxide, and the carboxylic acid is succinic acid.

12. The method of claim 1, wherein the alkali metal organo-salt catalyst is a pre-blended mixture of an alkali metal-organo salt and water.

13. The method of claim 12, wherein the alkali metal salt is potassium acetate.

14. The method of claim 12, wherein the alkali metal salt is sodium succinate.

15. The method of claim 12, wherein the alkali metal salt is sodium acetate.

16. The method of claim 3, wherein the catalyst contains more carboxylic acid chemical equivalents than it does alkali metal hydroxide chemical equivalents dissolved in water.

17. The method of claim 16, wherein a liquid mixture of at least one carboxylic acid with at least one alkali metal hydroxide dissolved in water is stabilized by the addition of a surfactant.

18. The polyisocyanurate modified polyurethane foam of claim 16.

19. The polyisocyanurate modified polyurethane foam of claim 17.

* * * * *